US010419054B1

(12) United States Patent
VanTassell et al.

(10) Patent No.: US 10,419,054 B1
(45) Date of Patent: Sep. 17, 2019

(54) MOBILE DEVICE HOLDER

(71) Applicant: Handstands Promo, LLC, Salt Lake City, UT (US)

(72) Inventors: Brandon D VanTassell, Erda, UT (US); Jason L. Fogg, Salt Lake City, UT (US)

(73) Assignee: Handstands Promo, LLC, Salt Lake City, UT (US)

( * ) Notice: Subject to any disclaimer, the term of this patent is extended or adjusted under 35 U.S.C. 154(b) by 0 days.

(21) Appl. No.: 15/912,135

(22) Filed: Mar. 5, 2018

(51) Int. Cl.
*H04B 1/3877* (2015.01)
*H04M 1/60* (2006.01)
*B60R 11/02* (2006.01)
*B60R 11/00* (2006.01)

(52) U.S. Cl.
CPC ........ *H04B 1/3877* (2013.01); *B60R 11/0241* (2013.01); *H04M 1/6041* (2013.01); *B60R 2011/0077* (2013.01); *B60R 2011/0078* (2013.01); *B60R 2011/0087* (2013.01)

(58) Field of Classification Search
CPC .............. H04B 1/3877; B60R 11/0241; B60R 2011/0087; B60R 2011/0077; B60R 2011/0078; H04M 1/6041
USPC ...................................................... 455/575.1
See application file for complete search history.

(56) References Cited

U.S. PATENT DOCUMENTS

| 9,723,910 | B2 * | 8/2017 | Due ......................... A45F 5/10 |
| 2011/0050164 | A1 * | 3/2011 | Partovi ................... H01F 5/003 320/108 |
| 2015/0382489 | A1 * | 12/2015 | Sorensen ................. G06F 1/16 248/558 |

OTHER PUBLICATIONS

Sears. "Billboard BB211 Cell Phone Ring Holder and Stand-Gold," http://www.sears.com/billboard-bb211-cell-phone-ring-holder-and/p-A011259162?plpSellerId=Kmart&prdNo=1&blockNo=1&blockType=G1 Product added Nov. 7, 2017.
The Grommet. "RingSpinner." https://www.thegrommet.com/ringspinner Oct. 12, 2017.
Ring Spinner. "Ring Spinner," https://www.ringspinner.com/ Copyright 2017.
Amazon. "Phone Holder stand with Stylish Finger Spinner," https://www.amazon.com/Casegory-Stylish-Spinner-Kickstand-Samsung/dp/B0732WWDKF/ref=cm_cr_arp_d_product_top?ie=YTF8 Reviews dated Aug. 3, 2017.

* cited by examiner

*Primary Examiner* — Eugene Yun
(74) *Attorney, Agent, or Firm* — Thorpe, North & Western, LLP

(57) ABSTRACT

A mobile device holder comprises a base having an inner side to be affixed to the mobile device. A hub is carried by the base and is rotatable on the base about a rotational axis. A rotational bearing rotatably couples the hub to the base. A ring is carried by the hub and is pivotally coupled to the hub about a pivot axis that is orthogonal to the rotational axis. The ring is rotatable along with the hub on the base. In addition, the ring is pivotable with respect to the hub between at least a retracted position circumscribing the hub, and a deployed position extending at an acute angle with respect to the hub. The hub has an exterior side with indicia thereon.

21 Claims, 6 Drawing Sheets

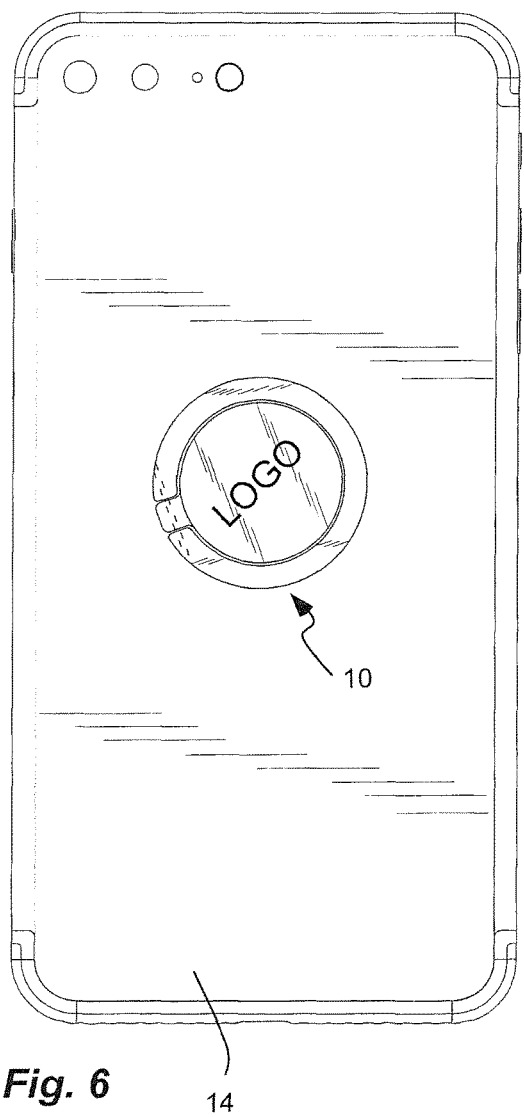
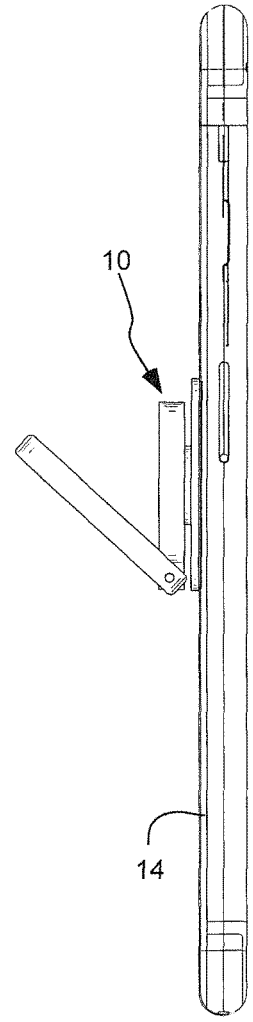
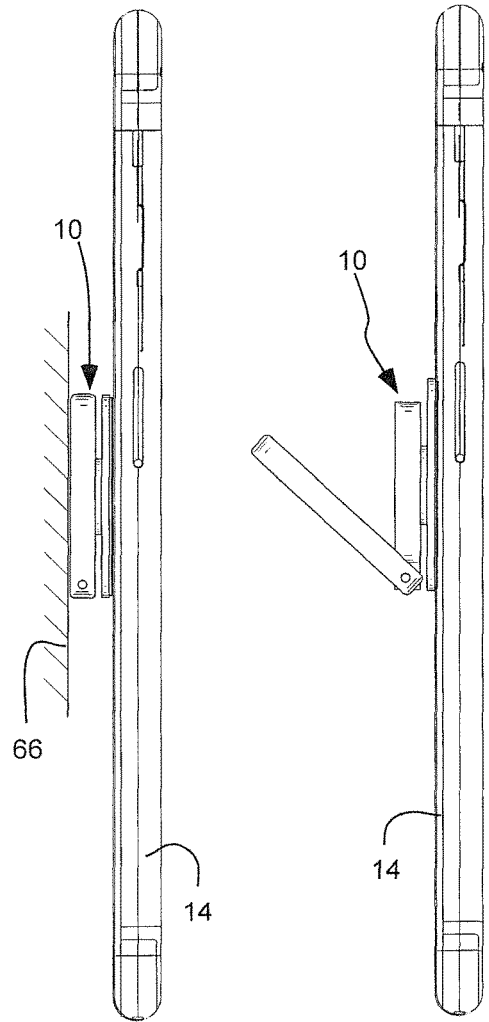
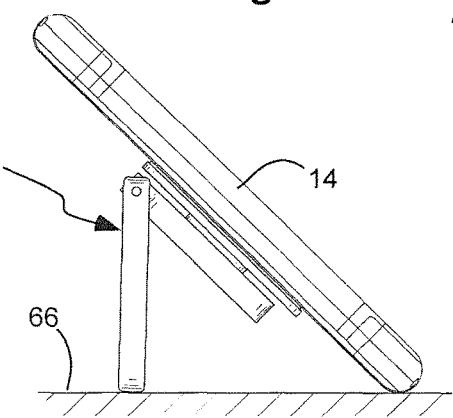
Fig. 6
Fig. 7
Fig. 8
Fig. 9

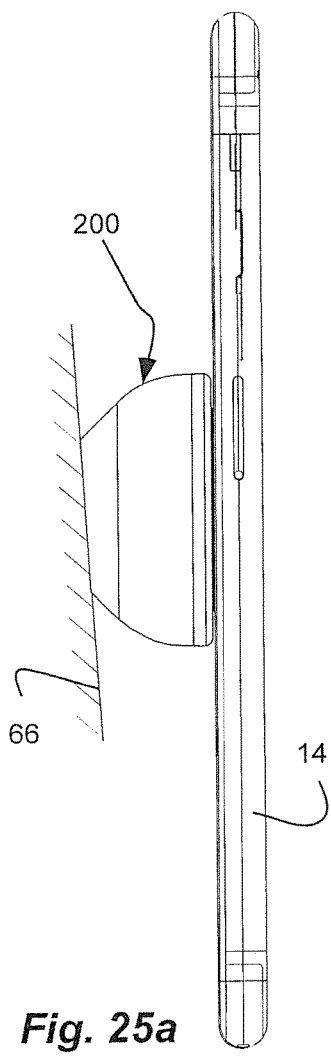
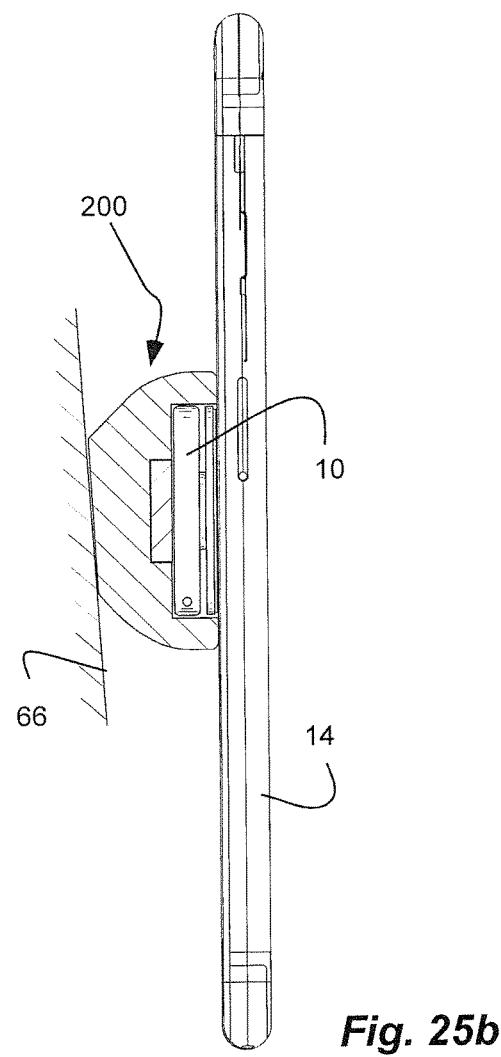
*Fig. 25a*  *Fig. 25b*
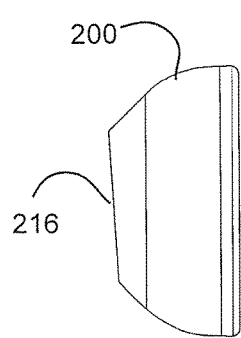
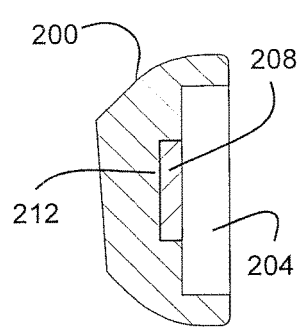
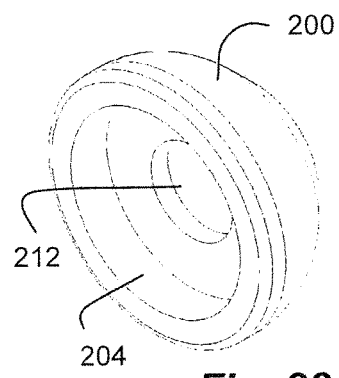
*Fig. 26*  *Fig. 27*  *Fig. 28*

MOBILE DEVICE HOLDER

BACKGROUND

Field of the Invention

The present invention relates generally to a holder to assist holding a mobile device, such as a cellular phone.

Related Art

Cellular phones as increasing in utility and decreasing in size, making them almost continuously held, but also easy to drop. In addition, sleek styling can make a cellular phone slip out of a user's grasp. Various different devices have been proposed to assist in holding the cellular phone. One such device is a ring that is secured to the back of the phone to receive a user's finger.

SUMMARY OF THE INVENTION

It has been recognized that it would be advantageous to develop a holder to assist in securely grasping a mobile device, such as a cellular phone. In addition, it has been recognized that it would be advantageous to develop a holder that can double as an attention getter with a continuous motion, sometimes referred to as a fidget spinner. In addition, it has been recognized that it would be advantageous to develop a holder capable of displaying information, such as a business logo, so that the holder can double as a promotional item. Furthermore, it has been recognized that it would be advantageous to develop a holder and a mount capable of mounting a mobile device.

The invention provides a mobile device holder with a base having an inner side to be affixed to the mobile device. A hub is carried by the base and is rotatable on the base about a rotational axis. A rotational bearing rotatably couples the hub to the base. A ring is carried by the hub and is pivotally coupled to the hub about a pivot axis that is orthogonal to the rotational axis. The ring is rotatable along with the hub on the base. In addition, the ring is pivotable with respect to the hub between at least a retracted position circumscribing the hub, and a deployed position extending at an acute angle with respect to the hub. The hub has indicia thereon.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 6 is a top view of the holder of FIG. 1, shown on a mobile device, namely a cellular phone;

FIG. 7 is a side view of the holder of FIG. 1, shown on the mobile device and disposed on a support surface;

FIG. 8 is a side view of the holder of FIG. 1, shown on the mobile device and shown with the ring in the deployed position;

FIG. 9 is an end view of the holder of FIG. 1, shown on the mobile device and shown with the ring in the deployed position and holding the mobile device at a viewing angle on the support surface;

FIG. 25a is a side view of a mount in accordance with another embodiment of the present invention shown coupling a mobile device to a support surface;

FIG. 25b is a side view of the mount of FIG. 25a shown in cross-section and receiving the holder therein;

FIG. 26 is a side view of the mount of FIG. 25a;

FIG. 27 is a cross-sectional side view of the mount of FIG. 25a;

FIG. 28 is a perspective view of the mount of FIG. 25a;

FIG. 30 is a side view of the mount of FIG. 29a;

FIG. 31 is a cross-sectional side view of the mount of FIG. 29a; and

FIG. 32 is a perspective view of the mount of FIG. 29a.

Figure 1:
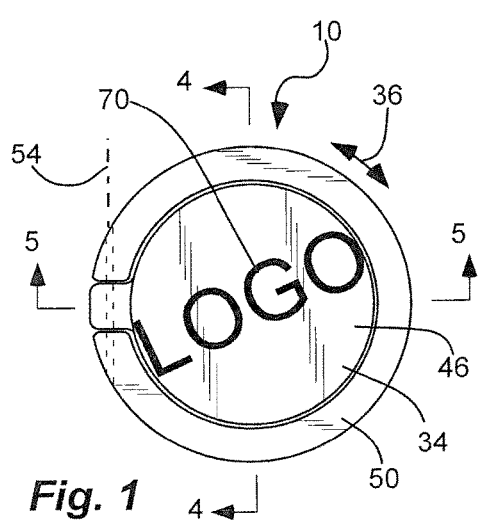
FIG. 1 is a top view of a holder in accordance with an embodiment of the present invention, shown with a ring in a retracted or withdrawn position or configuration.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "handheld electronic device" and "mobile device" are used interchangeably herein to refer broadly to a portable, hand-held electronic device, including by way of example, a cellular (cell) phone, a smart phone, a tablet computer or tablet, a phablet, a global positioning system (GPS), a mobile media player, a gaming system, a video monitor, and the like. The handheld electronic device can be a cell phone; an MP3 player (iPod® or the like) or other digital music player; a gaming device (Nintendo® DS; PSP®; etc.); a camera; a global positioning system (GPS) system; a personal digital assistant (PDA); a DVD player; a portable television; a digital camera; a video camera; a portable computer (laptop computer, iPad®, or the like); an e-book or e-reader (Kindle®, Nook®, iPad®, Sony Reader™, or the like), etc. Such a device can have a display screen upon which data, information, media, etc. is viewed; one or more inputs, such as buttons, a touch screen, etc.; one or more outputs, such as the screen, a speaker, an audio jack, etc.; one or more cameras; a power supply, such as a battery; a data storage system and a computing system. Such a device can also include a port or socket for receiving a power and/or data connection cord or plug. The mobile device can have a back or back surface, and a front or front surface. The display or touch screen can occupy a great majority of the front of the mobile device. The portable electronic device can be mobile and transportable. The portable electronic device can be carried by a user, such as in a pocket or purse, and also can be held in the user's hand(s).

The term "cellular phone" is used broadly herein to refer to a cellular phone, a cell phone, a smart phone, phablet, etc. Such cellular phones can be portable, handheld communication devices, or mobile devices, that can include a speaker, a microphone, one or more cameras, a transmitter and a receiver (or transceiver), a power supply or battery, a display screen or touch screen display and input device, other input devices, such as one or more buttons, etc. The cellular phone can have a back or back surface, and a front or front surface. The display or touch screen can occupy a great majority of the front of the cellular phone.

In addition, the terms "mobile device" and "cellular phone" are intended to refer to such mobile devices and cellular phones with a case, cover, skin, film, etc. thereon. Cell phones often are used with a case that surrounds the sides and back of the phone. In addition, cell phones can be utilized with skins that adhere or stick to the back and/or sides of the phone. The term "cell phone" is used herein to also refer to such cases or skins. Thus, a description of an item being attached to, affixed to, carried by, and the like, the cell phone or back thereof is intended to include being attached to, affixed to, carried by, and the like, the case or skin or back thereof. Furthermore, the terms "back surface" and "back" are used interchangeably for such mobile devices or cellular phones, and are intended to refer to the actual back or back surface of such devices, and the back or back surface of any case, cover, skin, film, etc. disposed thereon.

The terms "business", "company" are used broadly and interchangeably herein to refer to an organization that provides a product or a service. The business, company or organization can have a name, logo, slogan, trademark, service mark, etc. that is capable of identifying and/or distinguishing the business or company, or product or service, or both, or can otherwise be utilized to market, promote, and/or brand the business or company, or product or service, or both.

The terms "indicium" and "indicia" are used interchangeably herein, unless otherwise noted.

The terms "magnet" and "ferromagnetic" are used interchangeably herein and broadly to refer to a material or element that has magnetic properties and/or an ability to magnetically couple, either by being magnetic, or being magnetically attracted to a magnet (such as by containing iron) such that one ferromagnetic material or element is magnetically attracted to another ferromagnetic material or element. Thus, a magnet is magnetic, such as a permanent magnet, or is attracted to magnets, such as by containing iron.

The terms "interference fit" and "friction fit" and "resistance fit" and "press fit" are terms of art used interchangeably herein to refer to deliberately causing, increasing and/or using friction to deliberately resist movement. An interference fit or friction fit is different than and greater than the existence of friction. While friction may exist between any two surfaces, is often desirable to do all one can to reduce this friction. An interference fit or friction fit can be distinguished from naturally occurring friction by being actually deliberately caused and increased. An interference fit can be created by dimensioning engaging parts so that their surfaces tightly bear against one another. A friction fit can be created by surface roughness that is rougher.

DESCRIPTION

As illustrated in FIGS. 1-9, a mobile device holder, indicated generally at 10, in an example implementation in accordance with the invention is shown for facilitating handling or gripping of a mobile device 14, such as a cellular phone, and providing unique experiences with the mobile device. The holder 10 has a base 18 with an inner side 22 affixed to the mobile device 14. In one aspect, the base 18 can be affixed with doubled-sided tape or adhesive film 26. In another aspect, the base 18 can be releasably attached with an attachment pad that has a tacky surface, as described below. The inner side 22 of the base can be flat, and can be affixed directly to a back of the mobile device 14, or a case or skin thereof. In addition, the base 18 can be annular with a bore therethrough. Furthermore, the base 18 can have an axle 30 extending therefrom. The base 18 can be formed of metal, and by casting or machining, or can be formed of plastic, and by injection molding.

A hub 34 is carried by the base 18, and is rotatable (indicated by 36) on the base 18 about a rotational axis 38. The hub 34 can be substantially round or circular to facilitate rotation. The rotation 36 can be continuous, or the hub 34 can rotate or revolve indefinitely, limited only by friction, in either direction. The rotation 36 can be described as 360 degree rotation. The hub 34 can be formed of metal, and by casting or machining, or can be formed of plastic, and by injection molding. A rotational bearing 42 can rotatably couple the hub 34 to the base 18. The rotational bearing 42 can have an annular space or groove with a plurality of spherical bearings therein. The rotational bearing 42 can be positioned in the bore of the base 18. In addition, the rotational bearing 42 can be secured to the hub 34 by a fastener extending through the rotational bearing. Thus, the rotational bearing 42 can couple the hub 34 to the base 18, and/or the rotational bearing 42 can be coupled between the hub 34 and the base 18. The hub 34 can have an exterior side 46 with an exterior surface facing outwardly. In one aspect, the exterior side 46 and the exterior surface thereof can be exposed.

A ring 50 is carried by the hub 34, and is pivotally (indicated by 52) coupled to the hub 18 about a pivot axis 54 that is orthogonal to the rotational axis 38. The ring 50 can be substantially round or circular to facilitate rotation. The ring 50 can be formed of metal, and by casting or machining, or can be formed of plastic, and by injection molding. In one aspect, the ring 50 can have a gap 58 therein receiving a tab 62 extending laterally from the hub 34. Thus, the ring 50 can be coupled to a lateral side of the hub 34. In one aspect, a pin can extend through the ring 50 at the gap 58 thereof, and through the tab 62 of the hub 34, to pivotally couple the ring 50 to the hub 34. The pin can device the pivot axis 54. The ring 50 is rotatable 36 with the hub 14 on the base 18 about the rotational axis 38.

Figure 3:
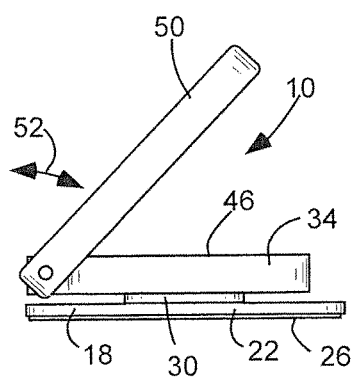
FIG. 3 is a side view of the holder of FIG. 1, shown with the ring in a deployed or extended position or configuration.
Figure 5:
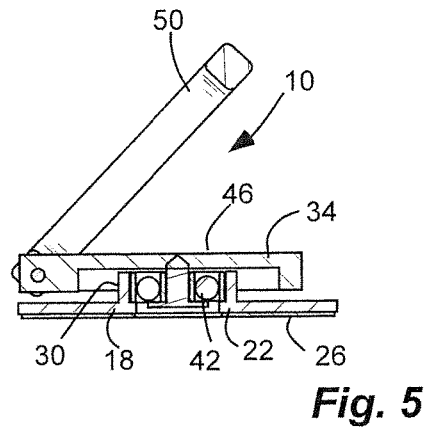
FIG. 5 is a cross-sectional side view of the holder of FIG. 1, taken along line 5 of FIG. 1, shown with the ring in the deployed position.
Figure 10:
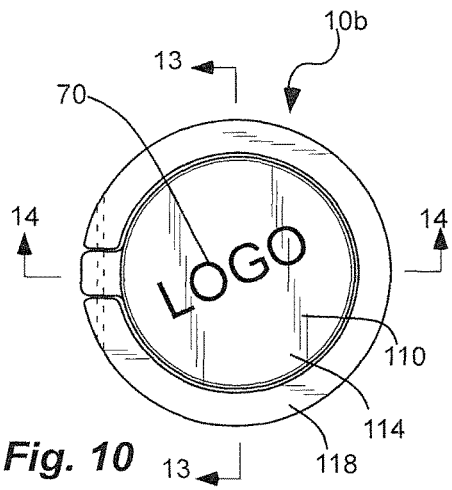
FIG. 10 is a top view of another holder in accordance with another embodiment of the present invention, shown with a ring in a retracted or withdrawn position or configuration.

In addition, the ring 50 can pivot 52 with respect to the hub 34 about the pivot axis 54 between at least two positions, including a retracted position (FIGS. 1 and 2) and a deployed position (FIG. 3). In the retracted position, the ring 50 circumscribes the hub 34 and the axle 30 of the base 18, and is adjacent the base 18 and the mobile device 14. The ring 50 can be positioned in the retracted position in order to store the mobile device 12, or to place the mobile device flat on a support surface 66, as shown in FIG. 7. In the deployed position, the ring 50 is at an acute angle with respect to the hub 34 and extends from the hub 34, the base 18 and/or the mobile device 14. The ring 50 can be positioned in the deployed position in order to receive a user's finger to help hold the mobile device, as shown in FIG. 8. In addition, the ring 50 can be positioned in the deployed position in order to prop the mobile device 14 at an angle on the support surface 66 for viewing, as shown in FIG. 9. The pivotal connection between the ring 50 and the hub 34 can be a friction or resistance fit, such as by a press fit between the pin and bores in the ring and the hub or tab, to allow the ring to be oriented at a desired angle, and to maintain that orientation. Thus, the angle of the ring 50 with respect to the hub 34 can be changed and maintained by the friction fit. The pivoting of the ring 50 with respect to the hub 34, the base 18 and/or the mobile device 14 can be characterized as substantially 180 degrees. The angle of the ring 50 with respect to the hub 34 in the deployed position can be substantially any angle greater than zero and up to 180 degree.

The holder 10 also has indicium or indicia 70 thereon, such as logo, indicative of or representing a business, a product, or both, carried thereby and visible to a viewer. The indicia 70 can identify or distinguish, or both, a business or entity, or product or service, or both. In one aspect, the indicia 70 can be disposed on the exterior side 46 of the hub 34. Thus, the indicia 70 can rotate 36 with the hub 34. In another aspect, the exterior side 46 of the hub 34 has a size or diameter, and the indicia 70 can extend across substantially the entire diameter of the exterior side. 46. In addition, the indicia 70 can extend from one lateral side of the hub 34 to an opposite lateral side. Thus, the indicia 70 can extend substantially across the hub 34 to increase the visual effect when rotating 36. In another aspect, the indicia 70 can cover a majority of the exterior surface of the exterior side 46 of the hub 34. In another aspect, the indicia 70 can cover at least 75% of the exterior surface of the exterior side 46 of the hub 34. In another aspect, the indicia 70 can cover essentially the entire exterior surface of the exterior side 46 of the hub 34. Again, having the indicia 70 cover or substantially cover or extend across a diameter of the hub 34 can enhance the visual effect when the hub 34 spins on the base 18. In one aspect, the exterior side 46 or exterior surface of the hub 34 can be flat, and the indicia 70 can be flat. Thus, the holder 10 and the hub 34 or the exterior side 46 thereof can lay flat against the support surface 66, as shown in FIG. 7. In one aspect, the exterior surface of the exterior side 46 of the hub 34 can be flat and smooth. Thus, the flat surface can facilitate directly printing the indicia 70 thereon. In another aspect, the exterior surface of the exterior side 46 of the hub 34 can be contoured, such as with a wavy or corrugated profile, or a cross-hatched surface, to provide a non-slip surface against the support surface 66.

In one aspect, the indicia 70 can be disposed on the hub, and/or the ring, by printing the indicia directly on the exterior side or exposed surface of the hub, and/or the ring. For example, direct ink jet printing or transfer pad printing can be used. In the case of transfer pad printing, multiple different etched clichés can be used for multiple different indicia for different holders.

In use, the holder 10 can be affixed or adhered to the back of the mobile device 14. The ring 50 can be deployed to receive a user's finger to assist in holding the mobile device 14. The ring 50 can be retracted for storage, or to lay the mobile device 14 upon a support surface 66. In one aspect, the hub 34 can be spun about the rotational axis 38, with the ring 50 retracted or deployed, to act as an attention getter, sometimes referred to as a fidget spinner. In another aspect, the indicia 70 of the holder 10 can be a business logo or the like, so that the holder can double as a promotional item.

Figure 15:
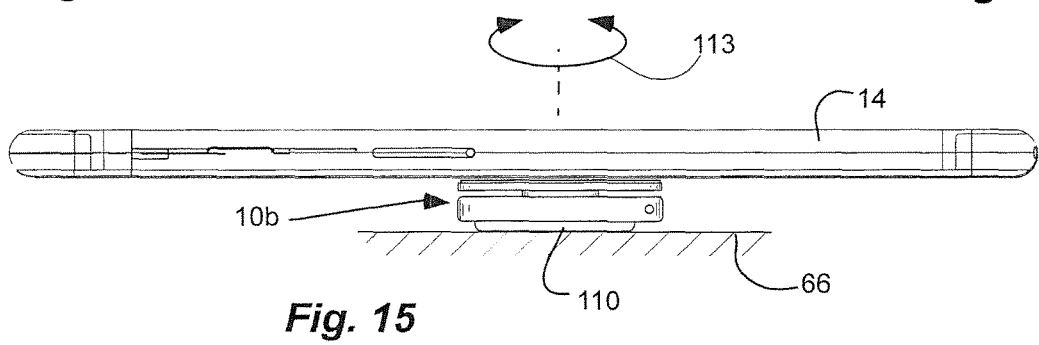
FIG. 15 is a side view of the holder of FIG. 10, shown on the mobile device and disposed on a support surface.
Figure 17:
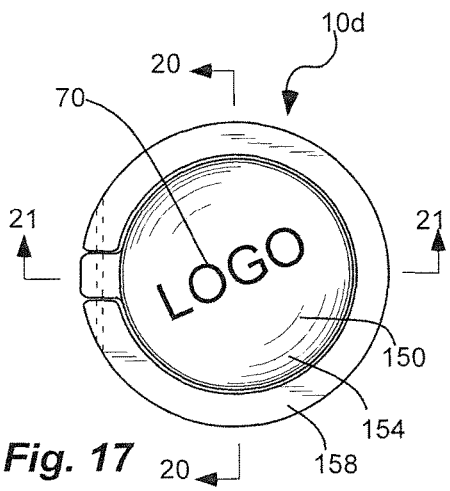
FIG. 17 is a top view of another holder in accordance with another embodiment of the present invention, shown with a ring in a retracted or withdrawn position or configuration.

Referring to FIGS. 10-15, another mobile device holder 10b is shown that is similar in many respects to that described above, and which description is hereby incorporated herein by reference. The holder 10b can comprise pad 110 positioned on and extending from the hub 34, and defining the exterior side or exterior surface. In one aspect, the exterior surface of the pad 110 can be tacky. Thus, the pad 110 can be a friction holding pad, and the tacky exterior surface can tend to cling to another object or surface, such as the support surface 66, in a mechanical fashion, as opposed to a chemical or adhesive manner. In another aspect, the exterior surface of the pad 110 can extend beyond or above an exterior surface or exterior side 46 of the hub 34 and the ring 50 when the ring 50 is in the retracted position. In another aspect, the mobile device 14 can be placed on the support surface 66, with the exterior surface of the pad 110 against the support surface 66, as shown in FIG. 15. The tacky exterior surface of the pad 110 can cling to the support surface 66 to resist displacement of the mobile device 14 while allowing the mobile device 14 spin 113 about the rotational bearing.

In one aspect, the indicia 70 can be disposed on the exterior surface of the pad 110. In another aspect, the pad 110 can be translucent or transparent, or at least translucent, and the indicia 70b (FIG. 13) can be disposed between the hub 34, or exterior side thereof, and the pad 110, and visible through the pad 110. In one aspect, the indicia 70b can be printed on the exterior side of the hub 34. In another aspect, the indicia 70b can comprise a graphic layer disposed between the hub 34 and the pad 110.

In one aspect, the pad 110 can comprise a polyurethane material, such as a polyurethane layer. It has been found that polyurethane can provide a tacky surface. In one aspect, the pad 110 can be affixed to the hub 34 with an adhesive. In another aspect, the pad 110 can be releasably attached to the hub 34 with utilizing the tacky nature of the pad 110 or the polyurethane material thereof. In one aspect, an inner surface of the pad 110 can be smoother than an outer surface of the pad. The inner surface can have a greater surface area in contact with the hub 34 to provide a greater frictional engagement. The outer surface can have less surface area in contact with the object or surface 66 to provide less frictional engagement. Thus, the pad 110 remains on the holder 10b or the hub 34 when the holder 10b and the mobile device 14 are removed from the object or surface 66, rather than removing the pad 110 from the holder 10b or the hub 34. The outer surface of the pad 110 can have contours or texture formed thereon to reduce the surface area of the outer surface in contact with the object or surface 66. The outer surface of the pad 110 can be contoured to include protrusions and/or indentations. The protrusions and indentations can be rounded or curvilinear to form a more gradual transition between the protrusions and indentations, and create a contour on the outer surface that is wavy. The contour of the outer surface creates an outermost surface on outer ends of the protrusions that contacts the object or surface 66. The outermost surface thus has less surface area in contact with the object or surface 66 than the inner surface has in contact with the hub 34 or the exterior side thereof. The contour, or protrusions or indentations, can extend at least substantially across the outer surface of the pad 110. The contour can be disposed on a majority of the outer surface of the pad 110. The contour can include an array or matrix of a plurality of indentations that can be formed in the outer surface of the pad 110 creating a plurality of protrusions therebetween.

The outer surface of the pad 110 can be non-chemically adhered to the object or surface 66. Similarly, the inner surface can be "tacky" and can tend to cling to the hub 34 or exterior side thereof in a mechanical fashion, as opposed to a chemical or adhesive manner. In another aspect, the pad 110 or the inner surface thereof can be adhered to the hub 34 or the exterior side thereof.

In another aspect, the pad can be formed of or can include an expanded vinyl material. It has been found that the expanded vinyl material provides a good frictional or "tacky" quality that remains disposed on the surface, and that retains the items thereon. The expanded vinyl material of the frictional holding pad can form a temporary non-chemical bond with the object or surface 66. The pad can be removed from the surface 66 without leaving behind any residue and without damaging the pad.

The expanded vinyl material more specifically can include: diisodecy/phlthalate; polymeric plasticer; a UV stabilizer; a vinyl hear stabilizer; a blowing agent for vinyl plastisol; and vinyl resin (plastic). The expanded vinyl material can have a weight between approximately 10 and 20 ounces per square yard; more preferably between approximately 12 and 18 ounces per square yard; and most preferably between approximately 14 and 16 ounces per square yard. The frictional holding pad 10 can have a thickness between approximately 0.03 and 0.09; more preferably between approximately 0.04 and 0.08 inches; and most preferably between approximately 0.05 and 0.06 inches.

The frictional holding pad can be formed of different layers with different materials. For example, the pad can have a skin layer formed on the inner surface formed of a different material than the rest of the pad. For example, the material of the skin layer can include: aqua ammonia ($NH_4OH$); azardine; rubber; color; and body for thickening. The skin layer can have a thickness between 0.003 and 0.006 inches, and more preferably between 0.004 and 0.005 inches.

Figure 16:
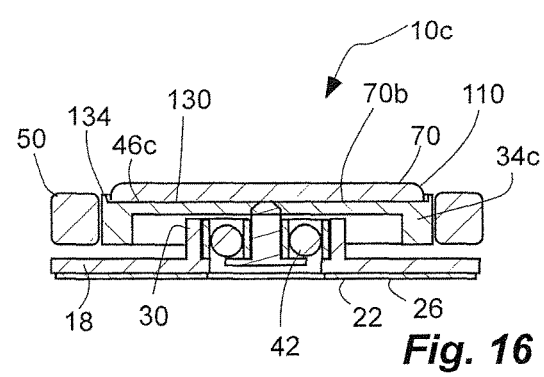
FIG. 16 is a cross-sectional side view of another holder in accordance with another embodiment of the present invention.
Figure 11:
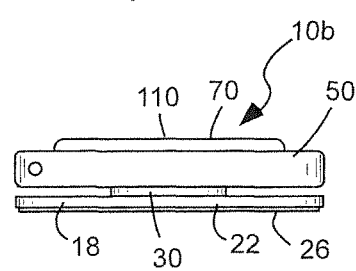
FIG. 11 is a side view of the holder of FIG. 10, again shown with the ring in the retracted position.
Figure 13:
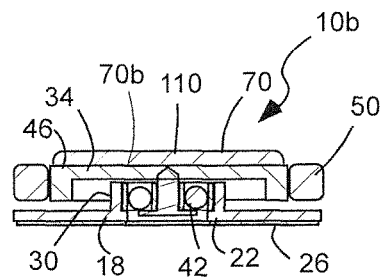
FIG. 13 is a cross-sectional side view of the holder of FIG. 10, taken along line 13 of FIG. 10, shown with the ring in the retracted position.
Figure 12:
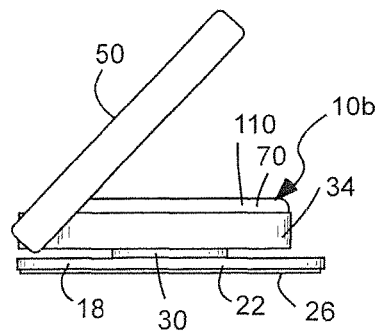
FIG. 12 is a side view of the holder of FIG. 10, shown with the ring in a deployed or extended position or configuration.
Figure 14:
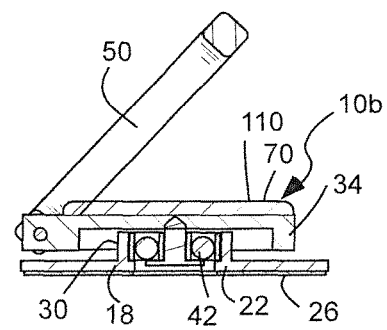
FIG. 14 is a cross-sectional side view of the holder of FIG. 10, taken along line 14 of FIG. 10, shown with the ring in the deployed position.

Referring to FIG. 16, another mobile device holder 10c is shown that is similar in many respects to that described above, and which description is hereby incorporated herein by reference. The holder 10c or the exterior side 46c of the hub 34c can have an indentation 130 formed in the exterior side 46c of the hub 34c and circumscribed by an annular lip 134. The pad 110, as described above, can be affixed to the exterior side 46c of the hub 34c, and disposed in the indentation 130. In one aspect, the indicia 70 can be on the exterior surface of the pad 110. In another aspect, the indicia 70b can be disposed between the hub 46c and the pad 110, and the pad 110 can be at least translucent so that the indicia 70b can be visible through the pad 110. In addition, the exterior surface of the pad 110 can extend above or beyond an exterior surface of the ring 50 when the ring is in the retracted position, and/or the exterior side 46c of the hub 34c. Thus, the pad 110 can have a thickness that is greater than a depth of the indentation 130 of the hub 34c. In another aspect, the exterior surface of the pad 110 can be flush with the exterior surface of the ring 50 in the retracted position.

Figure 22:
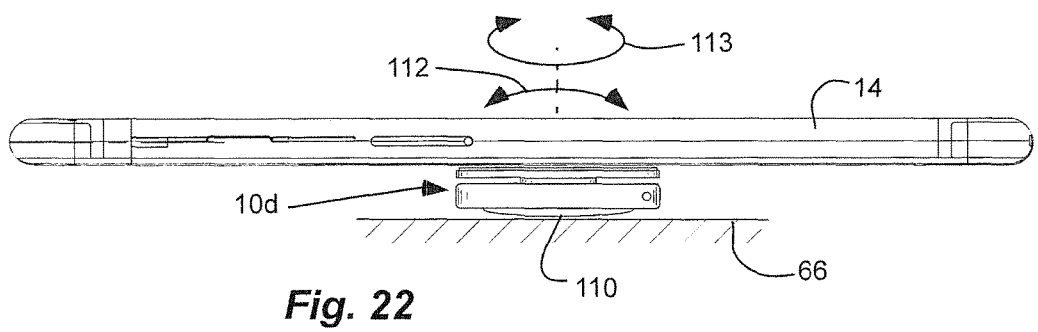
FIG. 22 is a side view of the holder of FIG. 17, shown on the mobile device and disposed on a support surface.
Figure 29A:
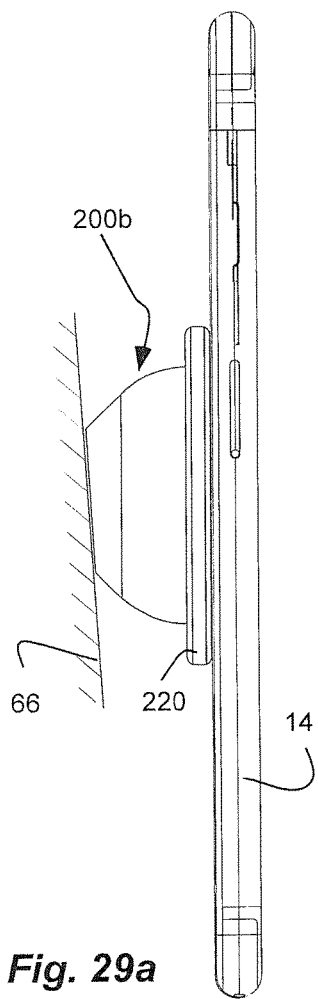
FIG. 29a is a side view of a mount in accordance with another embodiment of the present invention shown coupling a mobile device to a support surface.
Figure 29B:
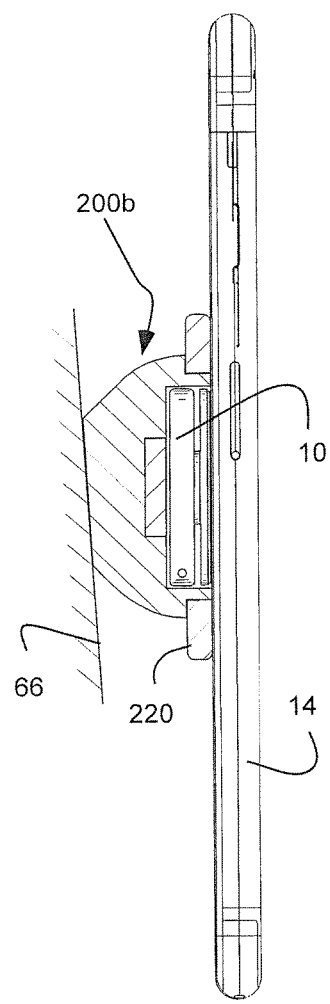
FIG. 29b is a side view of the mount of FIG. 29a shown in cross-section and receiving the holder therein.
Figure 30:
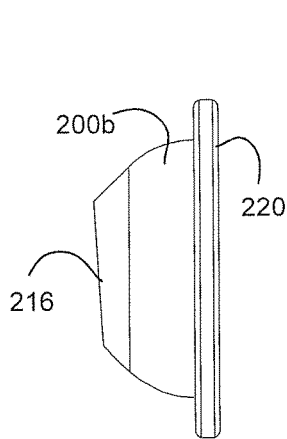
Figure 31:
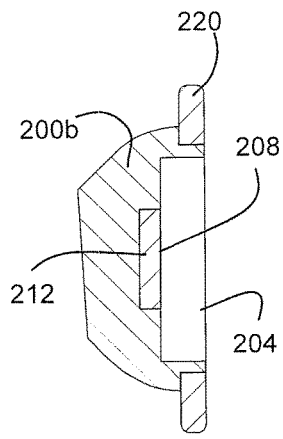
Figure 32:
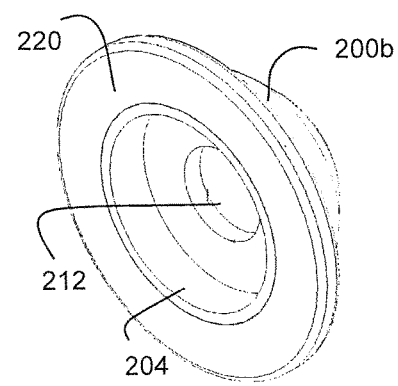

Referring to FIGS. 17-22, another mobile device holder 10d is shown that is similar in many respects to that described above, and which description is hereby incorporated herein by reference. The holder 10d can comprise a domed or semi-spherical exterior surface 150 extending from the hub 34 and defining the exterior side or exterior surface. The indicia 70 is disposed on the domed or semi-spherical exterior surface 150. Thus, the indicia 70 can be curved or arcuate, and can be visible from the side. In one aspect, the domed or semi-spherical exterior surface 150 extends beyond or above an exterior surface or exterior side 46 of the hub 34 and the ring 50 when the ring 50 is in the retracted position. In addition, the mobile device 14 can be placed on the support surface 66, with the domed or semi-spherical exterior surface 150 against the support surface 66, as shown in FIG. 22. The mobile device 14 can be pivoted 112 about the domed or semi-spherical exterior surface 150. In addition, the entire mobile device 14 can be spun 113 about the domed or semi-spherical exterior surface 150. In another aspect, the domed or semi-spherical exterior surface 150 can be tacky to resist movement of the surface 150, and thus the mobile device 14 on the support surface 66. For example, the domed or semi-spherical exterior surface 150 can comprise a polyurethane.

In one aspect, the exterior side 46 of the hub 34 itself can be shaped to form the domed or semi-spherical exterior surface 150. In another aspect, the holder 10d can comprise a domed or semi-spherical medallion 154 affixed to the exterior surface or exterior side 46 of the hub 34, and can define the exterior side upon which the indicia 70 is disposed. The domed or semi-spherical exterior surface 150 of the medallion 154 can extend beyond an exterior surface of the ring 50 when the ring is in the retracted position, as described above.

In another aspect, the holder 10d and/or the medallion 154 can comprise a squat dome 158 affixed to the exterior surface or exterior side 46 of the hub 34. The squat dome 158 can form the domed or semi-spherical exterior surface 150. The squat dome 158 can comprise a polyurethane dome. The polyurethane dome can be translucent or transparent. In addition, the polyurethane dome can further comprise a graphic layer 162, forming the indicia 70*b*, disposed between the exterior surface of the hub 34 and the polyurethane dome 158, and visible through the polyurethane dome 158. Thus, the polyurethane dome 158 can protect the graphic layer and indicia 70*b*.

In one aspect, the dome 158 can have a broad, flat shape with an outfacing surface with a flat and smooth center surrounded by a radius perimeter. In addition, the dome 158 can have the indicia 70 or 70*b*, such as logo, indicative of or representing a business, a product, or both, carried thereby and visible to a viewer. In one aspect, the indicia 70 can be on the domed or semi-spherical exterior surface 150. In another aspect, the indicia 70*b* can be disposed between the squat dome 158 or polyurethane dome and the hub 34, and visible through the squat dome or polyurethane dome.

In one aspect, the medallion 154 and/or the polyurethane dome 158 can be translucent or transparent, so that the exterior side 46 or exterior surface of the hub 34 can be visible through the dome 158. In another aspect, a graphic layer 162 can be disposed between the exterior side 46 or exterior surface of the hub 34 and the polyurethane dome 158, and visible through the polyurethane dome. In one aspect, the graphic layer 162 can include the indicia 70*b* so that the indicia 70*b* is visible through the dome 158, and protected by the dome 158.

As stated above, in one aspect, the dome 158 can be a polyurethane dome. The dome 158 can include the adhesive film 166 adhered to the exterior side 46 or exterior surface of the hub 34. The adhesive film 166 can use a chemical adhesive to adhere. The adhesive can be selected to provide sufficient adhesion between the dome 158 and the exterior side 46 or exterior surface of the hub 34 without separating as the holder 10*d* is repeatedly used. The adhesive can also be selected so that the dome 158 can be removed if desired. Thus, the adhesive film can include a releasable adhesive, as opposed to a permanent adhesive. The adhesive film can be a repositionable adhesive film releasably and repositionably adhered to the exterior side 46 or exterior surface of the hub 34. The adhesive film 166 can have an adhesive bond between the dome 158 and the exterior side 46 or exterior surface of the hub 34. The adhesive film 166 also has a contact surface between the adhesive film or dome 158 and the exterior side 46 or exterior surface of the hub 34. Furthermore, the adhesive and/or the adhesive film 166 can be substantially transparent, or at least translucent, so that the surface of the exterior side 46 or exterior surface of the hub 34 can be visible through the dome 158 and the adhesive film 166. The adhesive and/or adhesive film 166 can be a removable 3M Controltac™ adhesive.

The adhesive film 166 can be disposed on a substrate. The substrate can also be a film. In one aspect, the substrate can be substantially non-absorbent. The substrate can provide a surface, such as an upper or inner surface opposite the adhesive that can be printable. In addition, the substrate can be substantially transparent, or at least translucent, so that the surface of the exterior side 46 or exterior surface of the hub 34 can be visible through the dome 158, and the substrate. The substrate can be a printed 3M® graphics vinyl. Alternatively, the substrate can be a polyester film. The substrate can be any laminated (non-porous) substrate, including: polypropylene (PP), polyvinyl chloride (PVC), polyethylene terephthalate (PET), acrylonitrile-butadiene-styrene (ABS), polyester, regular sticker paper, vinyl, or tin metal (foil). Alternatively, the substrate can have be other films with other characteristics, such as reflective, metal shine, textured, etc.

The dome 158 can be affixed to the adhesive film 166 and/or the substrate, and adhered to the exterior side 46 or exterior surface of the hub 34 by the adhesive film. The dome 158 can be secured to the adhesive film 166 and/or substrate. The dome can have a broad, flat, squat shape with an outfacing surface that faces and contacts the user's or viewer's forehead. The outfacing surface can be smooth and flat and parallel with the adhesive layer. In addition, the outfacing surface can be surrounded by a radius perimeter. Thus, the perimeter of the outfacing surface curves toward the adhesive layer and face plate. In one aspect, all of the outfacing surface can be flat and smooth and continuous between the radiused perimeters. The dome and/or outward facing surface can be tacky to cling to the user's forehead or another surface, such as by mechanical or specific adhesion. Furthermore, the dome can be substantially transparent, or at least translucent, so that the surface of the face plate can be visible through the dome.

The dome 158 or the outfacing surface thereof can provide a non-slip surface that can engage the support surface 66. Thus, the outfacing surface can be sufficiently tacky to cling to the support surface 66, but sufficiently smooth or slippery to slid in and out of cases, purses, pockets of clothing and clothing accessories. The tackiness of the outfacing surface can be obtained through various factors, which can include material, hardness/softness, and coefficient of friction. As described above, the dome 158 can be formed of polyurethane. The polyurethane can be formed by combining a polyol with a catalyst or hardener. In one aspect, the ratio of polyol to catalyst can be between 1:0.63 to 0.85, so that there is more polyol than catalyst. In another aspect, the ratio of polyol to catalyst can be between 1:0.63 to 0.75. Typical polyurethane is obtained by mixing polyol and catalyst in a 1:1 ratio. In addition, in one aspect, the outfacing surface or the dome 158 can have a hardness between 10 and 35 Shore D. In another aspect, the outfacing surface or the dome 158 can have a hardness between 12 and 21 Shore D. In another aspect, the outfacing surface or the dome 118 can have a hardness between 12 and 18 Shore D. Other non-tacky stickers or decals typically can have a hardness of 60 Shore D or harder. Furthermore, the outfacing surface can have a coefficient of friction of between 0.3 and 0.1 in accordance with ASTM D 1894. Thus, the outwardly facing surface can be tacky to cling to the support surface 66, but smooth to facilitate insertion and removal from a pocket or purse.

A strength of the adhesive bond between the adhesive film 166 and the exterior side 46 or exterior surface of the hub 34 can be greater than a tacky cling between the outfacing surface of the dome 118 and the support surface 66. Thus, the dome 158 remains on the exterior side 46 or exterior surface of the hub 34 while the holder 10*d* and dome 158 are removed from the support surface 66. In addition, the contact surface between the adhesive layer 166 of the dome 158 and the exterior side 46 or exterior surface of the hub 34 can be greater than the outfacing surface of the dome 118 contacting the support surface 66 to further retain the dome 158 on the exterior side 46 or exterior surface of the hub 34 as the holder 10*d* and the dome 158 are removed from the support surface 66. Furthermore, the contact surface between the adhesive layer 166 of the dome 158 and the exterior side 46 or exterior surface of the hub 34 can have a perimeter greater than and circumscribing a perimeter of the outfacing surface of the dome 118 that contacts the support surface 66.

A graphic layer 162 can be disposed between the adhesive film 166 and the dome 158, or between the substrate and the dome. The graphic layer 162 can include ink disposed on or printed on the substrate. For example, the graphic layer 162 can be an aqueous based inkjet ink. The graphic layer 162 can include indicia 70b, such as a logo, a picture, etc. In addition, the graphic layer 162 can include directions for use, orientation, care, etc. Furthermore, the graphic layer 162 can be or can include other inclusions, as described in greater detail below. The graphic layer 162 can be visible through the dome 158. The graphic layer 162 and/or inclusion can be smaller or can have a smaller size than the substrate and the dome 158 such that the graphic layer and inclusion are surrounded by a perimeter of the dome and the substrate. In one aspect, the graphic layer 162 can include indicia 70 that is indicative of a business, company or organization, such as a name, logo, slogan, trademark, service mark, etc. that is capable of identifying and/or distinguishing the business or company, or product or service, or both, or can otherwise be utilized to market, promote, and/or brand the business or company, or product or service, or both.

The dome 158 can have a circular shape, as shown. Alternatively, other shapes are possible, such as a triangular shape with rounded corners or scripted (i.e. shaped-like letters). In one aspect, the dome 158 can be smaller than the surface of the exterior side 46 or exterior surface of the hub 34 to which it is applied. In addition, the dome 158 can have a thickness between 1-2 mm in one aspect, and 1.2-1.5 mm in another aspect. The thickness of the dome 158 can be dimensionally stable so that the dome is not generally compressible. The dome 158 can have a stiffness with a self-supporting flat layer, yet can be flexible enough to be bent to conform to a curvature of the exterior side 46 or exterior surface of the hub 34 (if present). The adhesive layer 166 can be sufficient to overcome the stiffness of the dome 158 and maintain the curved or bent nature of the exterior side 46 or exterior surface of the hub 34 when adhered to the exterior side 46 or exterior surface of the hub 34 (if curved). In addition, the dome 158 can be elastic to return to its self-supporting flat layer. The dome 158 and the outfacing surface can be substantially solid, flat, smooth and continuous.

As indicated above, the graphic layer 162 can be or can include an inclusion. The inclusions can be embedded in the dome 158. For example, the graphic layer 162 can be an etched metallic layer. The metallic layer can be etched to form the indicia 70. Other inclusions can be an LED (or other light source) and a battery power source; a hologram or lenticular artwork; an RFID computer chip or tag; a mirror; one or more gems or faux gems; etc. For example, an LED can be electrically coupled to a battery. The LED may remain continuously activated or lit. Alternatively, the LED may be activated, or the leads for the LED selectively contacted by the battery, such as by pressure applied to the dome 158. Alternatively, a light sensor can be electrically coupled between the battery and the LED to activate the LED in low light conditions. Other electronics can be included for special effects, such as flashing, etc. It will be appreciated that multiple lights or LEDs of one or more color can be included or embedded in the dome 158. As another example, a gem or faux gem can be embedded in the dome 158. The inclusion(s) can be disposed on the adhesive film 166 and/or substrate, and surrounded by the material of the dome 158 so that the inclusion project into the dome. Thus, the inclusions can be inclusions for the dome 158 and/or the graphics layer 162.

The dome 158 can also include inclusions embedded therein. For example, the dome 158 can include a scented material, such as a scented oil, that is permeable through the polyurethane material of the dome. In addition, the dome 158 can be colored and translucent. Furthermore, the dome 158 can include a florescent material.

In another aspect, the dome 158 can have an opaque dome with a graphic layer, such as printing, on the outfacing surface. The opaque dome can have a color to match or complement the hub 34 or the holder 10d.

As mentioned above, the dome 158 can have any shape. In addition, the dome 158 can be "scripted," i.e. shaped as particular letters, symbols, etc.; which can be interconnected or can be one or more separate and discrete portions.

As discussed above, the dome 158 or the outfacing surface can have a radius perimeter. The dome 158 can be made by pouring the polyurethane material on top of the substrate and graphic layer 162 to form the dome. Thus, the radius perimeter is obtained by individual pouring each dome, without stamping or cutting the dome from a continuous layer. The graphic layer 162 can be printed on the substrate having the adhesive film 166 opposite the graphic layer. The graphic layer 162 can be a discrete graphic contained within the dome 158, as opposed to a continuous graphic.

Figure 23:
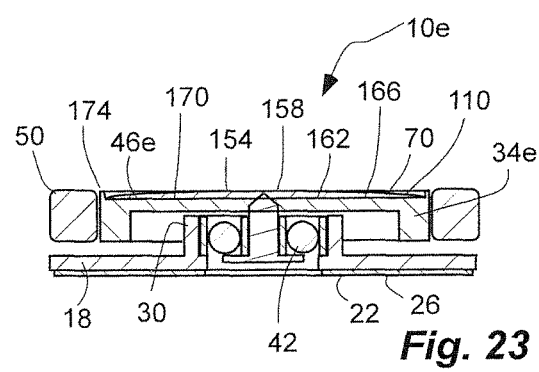
FIG. 23 is a cross-sectional side view of another holder in accordance with another embodiment of the present invention.
Figure 18:
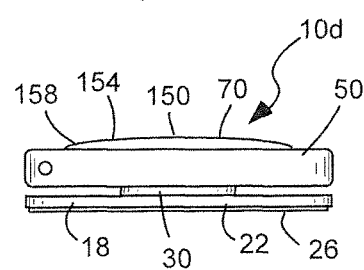
FIG. 18 is a side view of the holder of FIG. 17, again shown with the ring in the retracted position.
Figure 20:
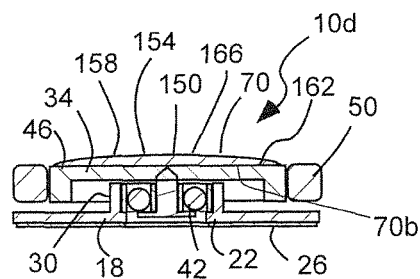
FIG. 20 is a cross-sectional side view of the holder of FIG. 17, taken along line 20 of FIG. 17, shown with the ring in the retracted position.
Figure 19:
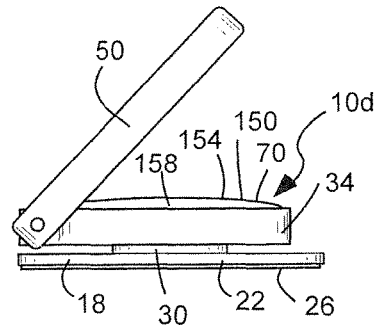
FIG. 19 is a side view of the holder of FIG. 17, shown with the ring in a deployed or extended position or configuration.
Figure 21:
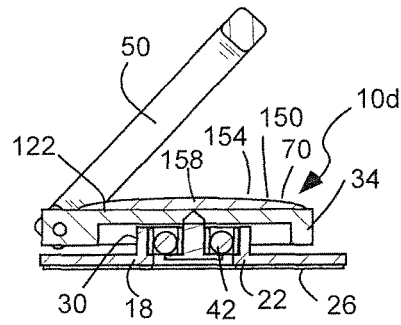
FIG. 21 is a cross-sectional side view of the holder of FIG. 17, taken along line 21 of FIG. 17, shown with the ring in the deployed position.

Referring to FIG. 23, another mobile device holder 10e is shown that is similar in many respects to that described above, and which description is hereby incorporated herein by reference. The holder 10e or the exterior side 46e of the hub 34e can have an indentation 170 formed in the exterior side 46e of the hub 34e and circumscribed by an annular lip 174. A domed or semi-spherical medallion 154 or a dome 158, as described above, can be affixed to the exterior side 46e of the hub 34e, and disposed in the indentation 170, and defining the exterior side. The indicia 70 can be on the domed or semi-spherical exterior surface 150 of the medallion 154 or the dome 158. A distalmost tip of the medallion 154 or the dome 158 can be flush or level or coplanar with an exterior surface of the ring 50 when the ring is in the retracted position, and/or the exterior side 46e of the hub 34e. Thus, the medallion 154 or the dome 158 can have a thickness that equals, or is less than, a depth of the indentation 170 of the hub 34e.

In another aspect, the distalmost tip of the medallion 154 or the dome 158 can extend beyond or above an exterior surface of the ring 50 when the ring is in the retracted position, and/or the exterior side 46e of the hub 34e. Thus, the medallion 154 or the dome 158 can have a thickness that is great than a depth of the indentation 170 of the hub 34e.

Figure 24:
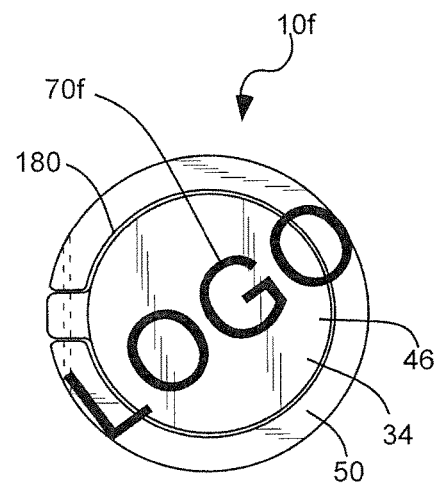
FIG. 24 is a top view of another holder in accordance with another embodiment of the present invention.
Figure 2:
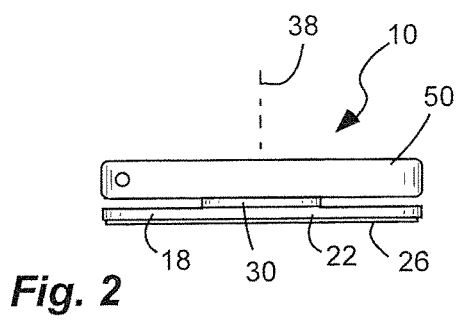
FIG. 2 is a side view of the holder of FIG. 1, again shown with the ring in the retracted position.
Figure 4:
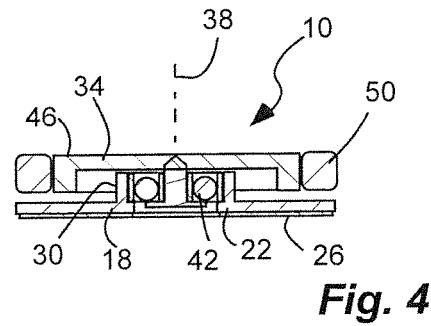
FIG. 4 is a cross-sectional side view of the holder of FIG. 1, taken along line 4 of FIG. 1, shown with the ring in the retracted position.

Referring to FIG. 24, another mobile device holder 10f is shown that is similar in many respects to that described above, and which description is hereby incorporated herein by reference. The ring 50 has an exterior surface facing outwardly when the ring is in the retracted position. The exterior surfaces of the hub 34 and the ring 50 are separated by an annular gap 180 defining a seam. The exterior surfaces of the hub 34 and the ring 50 are flush or coplanar when the ring is in the retracted position. The indicia 70f can extend across the diameter of the ring 50 and across the exterior surfaces of the hub 34 and the ring 50. The indicia 70f can be interrupted by the seam or gap 140.

As indicated above, one or more of the mobile device holders described above can be used as at least part of a promotional system. The indicia can promote a business and/or a product, and multiple mobile device holders can be provided with the same indicia indicative of the business and/or the product, which can be given away by the business to promote the business and/or the product. Thus, the mobile device holders can be promotional items. Thus, multiple mobile device holders can be obtained, as well as multiple different indicia, or medallions or domes. A first plurality of first indicia can be disposed on a first plurality of mobile device holders, while a second plurality of second indicia, different than the first indicia, can be disposed on a second plurality of mobile device holders. Thus, the same multiple of mobile device holders can be used for different indicia. In one aspect, disposing or affixing the indicia to the hub, and/or the ring, of the multiple mobile device holders can comprise printing the indicia directly on the exterior side or exposed surface of the hub, and/or the ring. For example, direct ink jet printing or transfer pad printing can be used. In the case of transfer pad printing, multiple different etched clichés can be used for multiple different indicia. In another aspect, disposing or affixing the indicia to the hub of the multiple mobile device holders can comprise preparing multiple different medallions or domes, each with the different indicia. Thus, a plurality of different indicia is each disposed on a different one of the plurality of domed or semi-spherical medallions.

Referring to FIGS. 25a-28, a mount 200 in accordance with an embodiment is shown with a mobile device 14 and a holder as described above, and represented by holder 10. The mount 200 can be secured to a support surface 66, such as a dashboard of a vehicle. In addition, the mount 200 can receive the holder 10 to releasably secure the mobile device 14 to the support surface via the holder 10. The mount 200 can have a cavity 204, or primary cavity, sized and shaped to receive and match the holder 10, or the hub 34 and ring 50 thereof. The mount 200 can have an opening into the cavity 204. Thus, the holder 10, and the hub 34 and the ring 50, can nest in the cavity 204. A releasable attachment 208 can be disposed in a secondary cavity 212 adjacent the primary cavity 204 in the holder to releasably secure the hub 34 and the ring 50 in the cavity 204. In one aspect, the releasable attachment 208 can be a magnet. In another aspect, the releasable attachment can comprise the tacky exterior surface of the pad described above. An annular face of the mount 200 can abut to the mobile device 14 such that the entire holder 10, or all of the hub 34 and the ring 50, is received in the cavity 204. The mount 200 can have a mount surface 216 opposite the cavity 204 and the opening thereto.

Referring to FIGS. 29a-32, another mount 200b similar in many respects to that described above is shown, and which description is hereby incorporated herein by reference. The mount 200b can have a wireless charging coil 220 carried by the mount and positioned to be disposed adjacent the mobile device 14 when the hub 34 and the ring are disposed in the cavity 204 of the mount. The wireless charging coil 220 can be coupled to a power source and a controller to modulate an electrical charge and thus a magnetic field to induce a magnetic field in a charging coil in the mobile device to produce an electrical charge therein to charge a battery in the mobile device while the mobile device is attached to the mount. The term charging coil 220 is used broadly herein to refer to any type of antenna or coupler in which wireless charging is accomplished.

In another aspect, the base 18 can be affixed to the mobile device 14 with an attachment pad disposed on the inner side of the base 18 to releasably affix the base to the mobile device 14. The attachment pad can be the same as the pad described above. In one aspect, the attachment pad can comprise a polyurethane pad with a tacky outer surface.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A mobile device holder, comprising:
 a) a base having an inner side configured to be affixed to the mobile device;
 b) a hub carried by the base and continuously rotatable on the base about a rotational axis;
 c) a rotational bearing with bearings rotatably coupling the hub to the base;
 d) a ring carried by the hub and pivotally coupled to the hub about a pivot axis that is orthogonal to the rotational axis, the ring being continuously rotatable along with the hub on the base, the ring pivotable with respect to the hub between at least a retracted position circumscribing the hub, and a deployed position extending at an acute angle with respect to the hub;
 e) indicia carried by the hub;
 f) a pad positioned on and extending from the hub and having an exterior surface;
 g) the exterior surface of the pad extending beyond the ring in the retracted position; and
 h) the exterior surface of the pad being tacky.

2. The holder in accordance with claim 1, wherein the indicia identify or distinguish, or both, a business or entity, or product or service, or both.

3. The holder in accordance with claim 1, wherein the indicia is disposed on an exterior side of the hub; wherein the exterior side has a diameter; and wherein the indicia extend across the diameter of the exterior side, and substantially from one lateral side to an opposite lateral side.

4. The holder in accordance with claim 1, wherein the indicia is disposed on an exterior side of the hub; wherein the exterior side has an exterior surface facing outwardly; and wherein the indicia cover a majority of the exterior surface of the hub.

5. The holder in accordance with claim 1, wherein the indicia is disposed on an exterior side of the hub; wherein the exterior side has an exterior surface facing outwardly; and wherein the indicia cover at least 75% of the exterior surface.

6. The holder in accordance with claim 1, wherein the indicia is disposed on an exterior side of the hub; wherein the exterior side of the hub has a diameter and an exterior surface facing outwardly; wherein the ring has an exterior surface facing outwardly when the ring is in the retracted position; wherein the exterior surfaces of the hub and the ring are separated by an annular gap defining a seam; wherein the indicia extend across the diameter of the ring and across the exterior surfaces of the hub and the ring; and wherein the indicia is interrupted by the seam.

7. The holder in accordance with claim 1, wherein the indicia is disposed on an exterior side of the hub; wherein the exterior side of the hub has an exterior surface facing outwardly; wherein the ring has an exterior surface facing outwardly when the ring is in the retracted position; and wherein the exterior surfaces of the hub and the ring are flush or coplanar when the ring is in the retracted position.

8. The holder in accordance with claim 1, wherein the indicia is disposed on the exterior surface of the pad.

9. The holder in accordance with claim 1, wherein the pad is translucent or transparent; and wherein the indicia is disposed between the hub and the pad, and is visible through the pad.

10. The holder in accordance with claim 1, wherein the pad comprises a polyurethane layer.

11. The holder in accordance with claim 1, further comprising:
   a) an indentation formed in the hub and circumscribed by am annular lip; and
   b) the pad being disposed in the indentation.

12. The holder in accordance with claim 1, further comprising:
   a) a mount configured to be secured to a support surface;
   b) a cavity sized and shaped to receive the hub and the ring; and
   c) a releasable attachment to releasably secure the hub and the ring in the cavity of the mount.

13. The holder in accordance with claim 12, wherein the releasable attachment comprises a magnet disposed in the mount adjacent to the cavity.

14. The holder in accordance with claim 12, further comprising:
   a wireless charging coil carried by the mount and positioned to be disposed adjacent to the mobile device when the hub and the ring are disposed in the cavity of the mount.

15. The holder in accordance with claim 1, further comprising an attachment pad disposed on the inner side of the base and configured to releasably affix the base to the mobile device; and wherein the attachment pad comprises a polyurethane pad with a tacky outer surface.

16. The holder in accordance with claim 1, further comprising:
   a domed or semi-spherical exterior surface extending from the hub and defining the exterior side.

17. The holder in accordance with claim 1, further comprising:
   a) a squat dome affixed to the exterior surface of the hub; and
   b) the squat dome having a domed or semi-spherical exterior surface.

18. A promotional system comprising a plurality of holders in accordance with claim 1; and wherein the indicia comprise a plurality of different indicia disposed on the plurality of holders.

19. A mobile device holder, comprising:
   a) a base having an inner side configured to be affixed to the mobile device;
   b) a hub carried by the base and continuously rotatable 360 degrees on the base about a rotational axis configured to be perpendicular to the mobile device;
   c) a rotational bearing with bearings in an annular space and rotatably coupling the hub to the base;
   d) a ring carried by the hub and pivotally coupled to the hub about a pivot axis that is orthogonal to the rotational axis, the ring being continuously rotatable along with the hub on the base, the ring pivotable with respect to the hub between at least a retracted position circumscribing the hub, and a deployed position extending at an acute angle with respect to the hub;
   e) a pad positioned on and extending from the hub and having an exterior surface;
   f) the exterior surface of the pad extending beyond the ring in the retracted position; and
   g) the exterior surface of the pad being tacky.

20. The holder in accordance with claim 19, further comprising indicia carried by the pad or the hub, the indicia identify or distinguish, or both, a business or entity, or product or service, or both.

21. The holder in accordance with claim 19, further comprising:
   a) a mount configured to be secured to a support surface;
   b) a cavity sized and shaped to receive the hub and the ring; and
   c) a releasable attachment to releasably secure the hub and the ring in the cavity of the mount.

* * * * *